United States Patent [19]
Monroe et al.

[11] Patent Number: 5,159,362
[45] Date of Patent: Oct. 27, 1992

[54] DIMENSIONAL TRANSFORMATION SYSTEM AND RELATED METHOD OF CREATING VISUAL EFFECTS

[75] Inventors: Marshall M. Monroe, Glendale; William G. Adamson, Pacoima, both of Calif.

[73] Assignee: The Walt Disney Company, Burbank, Calif.

[21] Appl. No.: 830,119

[22] Filed: Jan. 30, 1992

[51] Int. Cl.$^5$ ............................................. G03B 21/32
[52] U.S. Cl. .................................. 352/85; 352/86; 352/87; 352/89; 352/43; 352/47; 352/48; 352/52; 359/446
[58] Field of Search ............. 352/85, 86, 87, 89, 352/43, 47, 48, 52, 54; 359/446

[56] References Cited

U.S. PATENT DOCUMENTS

| | | | |
|---|---|---|---|
| 2,100,148 | 11/1937 | Parker | 359/446 |
| 2,707,103 | 4/1955 | Fischinger | 352/85 |
| 3,053,144 | 9/1962 | Harries et al. | 352/85 |
| 3,140,347 | 7/1964 | Cohen | 352/85 |
| 3,420,598 | 1/1969 | Goss | 359/446 |
| 3,442,508 | 5/1969 | Rudas | 352/85 |
| 3,480,346 | 11/1969 | Reitz et al. | 352/85 |
| 3,973,840 | 8/1976 | Jacobs et al. | 352/86 |

*Primary Examiner*—Monroe H. Hayes

[57] ABSTRACT

A dimensional transformation apparatus and related method for creating visual effects for use in live and prerecorded entertainment. The system engages an elastic projection screen with a three-dimensional object that corresponds to visual effects to be projected. By application of vacuum between the screen and the object, the screen is conformed in skintight relation to the features of the three dimensional object. An actuator, which includes a pneumatic piston, motivates the three-dimensional object to selectively engage and disengage the projection screen, and may be sequenced with projected animation corresponding to the three-dimensional object so as to create multi-dimensional special effects. A control mechanism, including a computer and timing system, digitally controls and sequences projection, dimensional transformation of the screen and background lighting and sound effects.

33 Claims, 7 Drawing Sheets

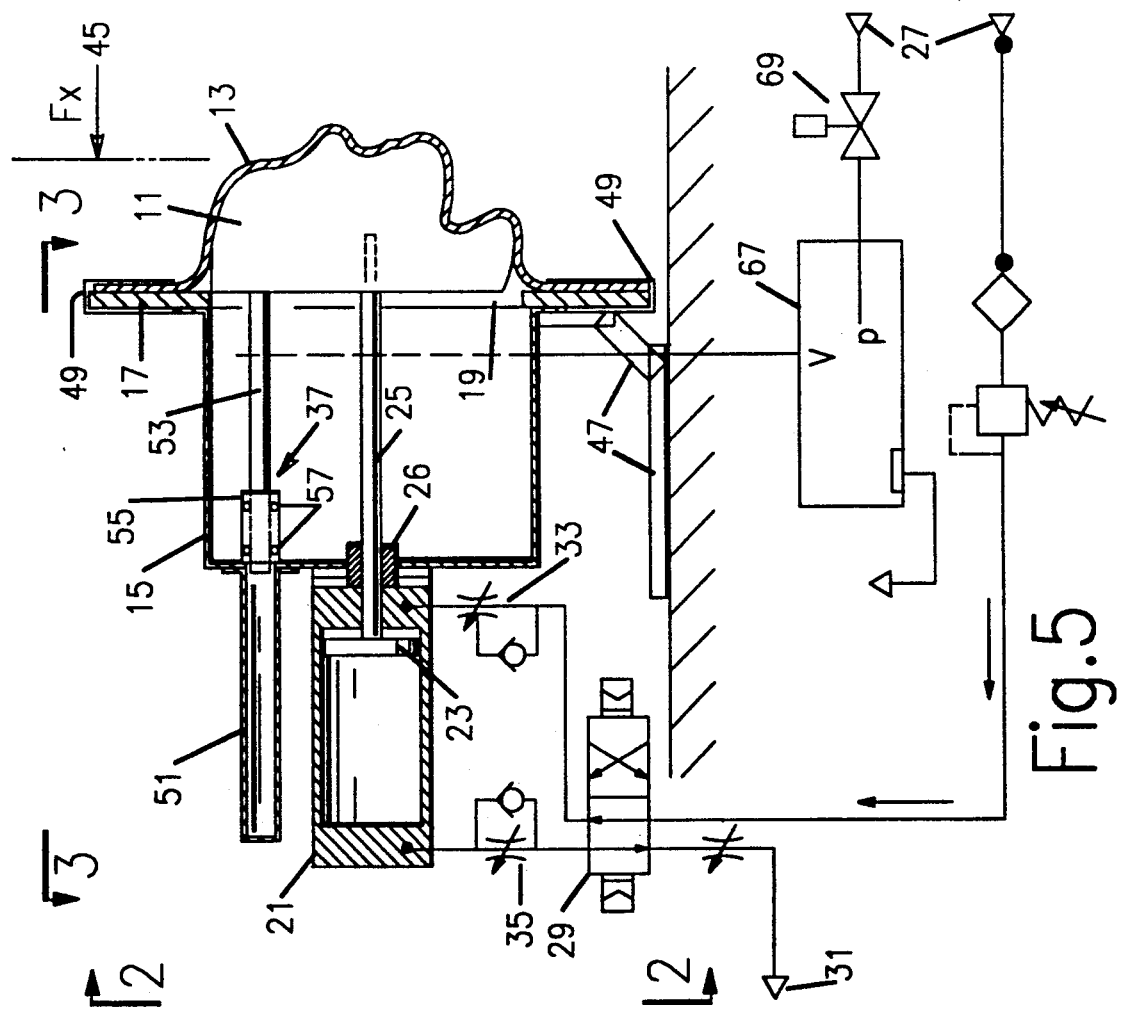
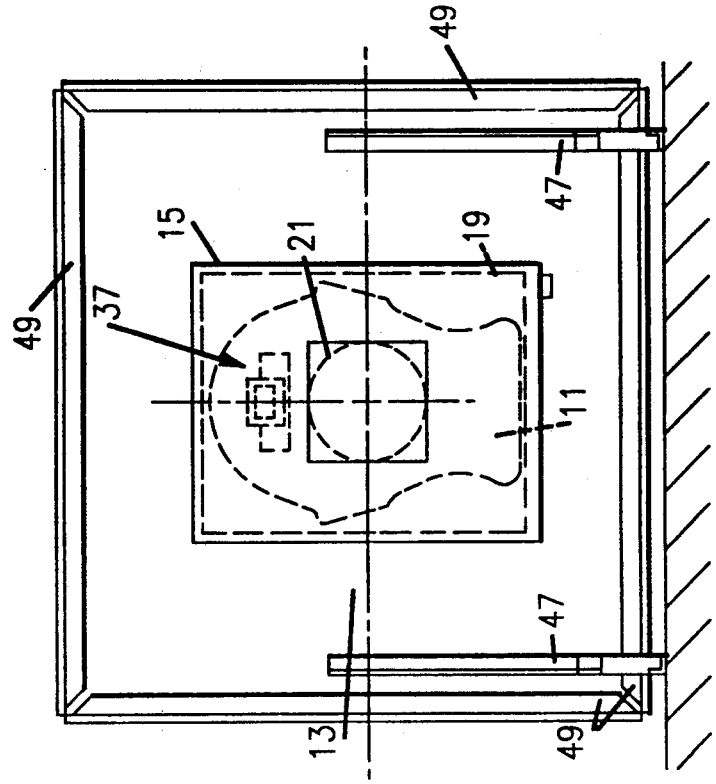

DIMENSIONAL TRANSFORMATION SYSTEM AND RELATED METHOD OF CREATING VISUAL EFFECTS

BACKGROUND OF THE INVENTION

The present invention relates to a dimensional transformation apparatus and a related method of creating visual effects and, in particular, to a special effects device.

The field of special effects is frequently concerned with altering an item's appearance to be something that it is not. Visual effects are an important element of these special effects, and of the entertainment industry in general. One popular effect, frequently employed in motion pictures, is the seeming transformation of an object's shape into the shape of another unrelated object. This effect is commonly seen in the context of science fiction or horror effects, for example, a man appearing to walk through a wall or other solid object. Such effects are generally difficult to create, and can typically only be effectively done with the aid of sophisticated and expensive electronics and software, or post-production editing.

These same visual effects are important in live entertainment as well. However, since these effects are produced in real-time, post-production and other sophisticated electronic effects are generally not of practical use. Also, such effects by their very nature need to be recreated in real-time for each subsequent performance to a live audience, which makes expensive effects impractical.

One way of making surfaces transform dimensionally that has been used successfully in film has been to deform an elastic surface, such as soft rubber or the like, by engaging it with a three-dimensional object. For example, motion pictures have utilized sheets of soft rubber in engagement with human hands to create the illusion that the hand is emerging through a hard surface represented by the rubber, such as a wall, or through a window. However, these effects suffer from the special materials required to produce them and the necessity of post-production enhancement to produce the requisite amount of realism. For example, the soft rubber needed to produce the effect discussed above requires superelasticity, and thus is generally not durable. Also, the soft rubber does not adhere completely to the three-dimensional object, necessitating electronic or post-production enhancement to impart realism to the desired effect.

Also, such effects are typically impractical in their application to live entertainment. In the example discussed above, air trapped between the engaged hands and rubber screen may detract from the intended effect. The lack of skin tight adherence to the deforming three-dimensional object can typically not be cured in real-time, which further detracts from the realism of the intended effect. Additionally, such a system may need to be constructed to the particular specifications of the intended use, such as the intended speed of engagement, or shape or size of the object used to engage the rubber sheet. This further detracts from the useful life of the device creating the effect.

Thus, the methods and devices used to create these effects are typically not flexible or adaptable to real time uses, or varying effects, and lack the durability and ease of maintenance necessary for ready and repeated employment. For these reasons, the mentioned effects have found little utility, especially in theme parks. They generally cannot be continually and repeatedly performed without frequent replacement of materials, for example, the soft rubber screen, mentioned above. Additionally, these effects lack the sophistication necessary to produce the desired realism without post-production enhancement, such as coloring or matting with additional images.

Accordingly, there has existed a definite need for an apparatus or method which can dimensionally transform a surface and create realistic three-dimensional effects, and yet which provides flexibility, reusability and easy maintenance in producing these special effects. This needed apparatus or method should be applicable, not only in the theme park or real time amusement setting, but should offer the same advantages to and have similar utility in the entertainment industry in general, for example, the creation of motion picture special effects. The present invention satisfies these needs and provides further related advantages.

SUMMARY OF THE INVENTION

The present invention provides a new visual effect where a flat surface (e.g., a wall, floor, television screen, ceiling, drafting table, etc.) transforms into a contoured three-dimensional object. The effect of transforming this surface can be augmented by the use of sequenced projection onto the surface to create various special effects, including the impression that the surface itself is animated. Accordingly, it is expected that the invention will find wide-ranging application as a special effect for use in entertainment, such as in films or amusement attractions.

The invention provides a dimensional transformation apparatus and a method of creating visual effects that impart a vivid and realistic appearance of a three-dimensional object. In accordance with the invention, an elastic screen is engaged with a three-dimensional object, such as a statue or bust, such that the elastic screen can be accurately deformed to the object's shape, yet still return to its original form when disengaged with the three-dimensional object. More particularly, when combined with lighting effects, the three-dimensional object is mounted behind the screen and caused to engage the screen to deform it to create a three-dimensional projection surface. In this way, the screen can be altered by one or more three-dimensional objects to nearly any shape, to impart realistic and vivid special effects. At the same time, the three-dimensional object is hidden from viewers adding to effects created. Lighting effects, a specific image or animation may be projected onto the screen to further enhance the effect of the three-dimensional object. As an example, the projection surface may be shaped as a head and the projected image may be facial features that align with the projection surface. By projecting sequential images, the head may appear animated and appear to "talk" or make facial gestures.

More particularly, the invention utilizes a pressure differential to exactly adhere the screen to the three-dimensional object when the two are moved into engagement. This application of pressure is sequenced with motivation of the three-dimensional object into engagement with the screen by an actuator, such that the pressure is released upon withdrawal of the object, allowing the screen to return to a two-dimensional form.

The apparatus may employ one or more projectors and a control mechanism for sequencing projection of lighting effects and actuation of the dimensional transformation effects. These lighting effects may be tailored to provide nearly any desired effect, and may include, for example, shadowing, coloring, animation, an object-image, a still image, a sequence of images, or any other imaginable lighting scheme. The control mechanism has a computer that controls creation of the desired projected lighting effect as stored on disc, videotape or other memory, and also a timer/sequencer that synchronizes projection with the deformation of the elastic screen.

The elastic screen may be advantageously composed of a silicone elastomer or similar chemical compound that enables it to stretch repeatedly and elastically without degeneration. In this manner, the elastic screen may be continually employed over many thousands of cycles of life without requiring replacement. Additionally, this composition allows for easy patching, further reducing any required maintenance or repair.

These and other features and advantages of the invention may be better understood by referring to the following detailed description, which should be read in conjunction with the accompanying drawings.

BRIEF DESCRIPTION OF THE DRAWINGS

The accompanying drawings illustrate the invention. In such drawings:

FIG. 5 is a cross-sectional view of an apparatus embodying the principles of the current invention, and showing an elastic screen engaged with and deformed by a three-dimensional object, a vacuum chamber, and diagrammatically showing elements of an actuator for moving the three-dimensional object toward the extended position with the elastic screen;

FIG. 6 is a back view of the apparatus of FIG. 5, looking in the direction shown by the lines 6—6 of FIG. 5, but which does not show the diagrammatic elements of FIG. 5;

DETAILED DESCRIPTION

The preferred embodiment of the invention, as shown in the accompanying exemplary drawings, is a dimensional transformation system that engages a three-dimensional object 11 with a elastic screen 13 to provide special effects for live and prerecorded entertainment. More particularly, the system is designed to present special effects to a viewing audience based upon appropriate lighting of a screen 13 that can be arranged to alter its form to nearly any shape. For example, in accordance with the principles of the present invention, the screen may be deformed to change shape by its engagement with a statue or a mold so as to impart animation in cooperation with that provided by a projected image. As an alternative example, a cartoon character may be made to emerge from a TV screen, or made to impact with the form of a wall or other seemingly rigid surface.

Figure 1:
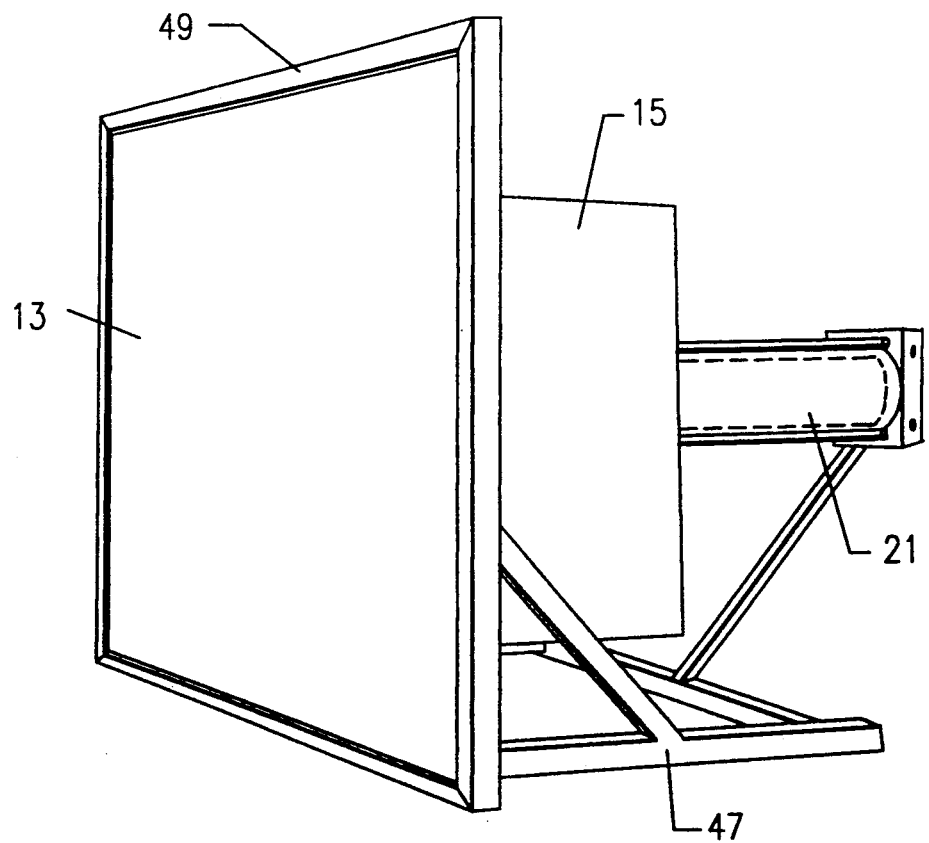
FIG. 1 is a perspective view showing a mounted elastic screen having a vacuum chamber and piston for moving a three-dimensional object (not shown) from a withdrawn position into deforming engagement with the elastic screen.
Figure 2:
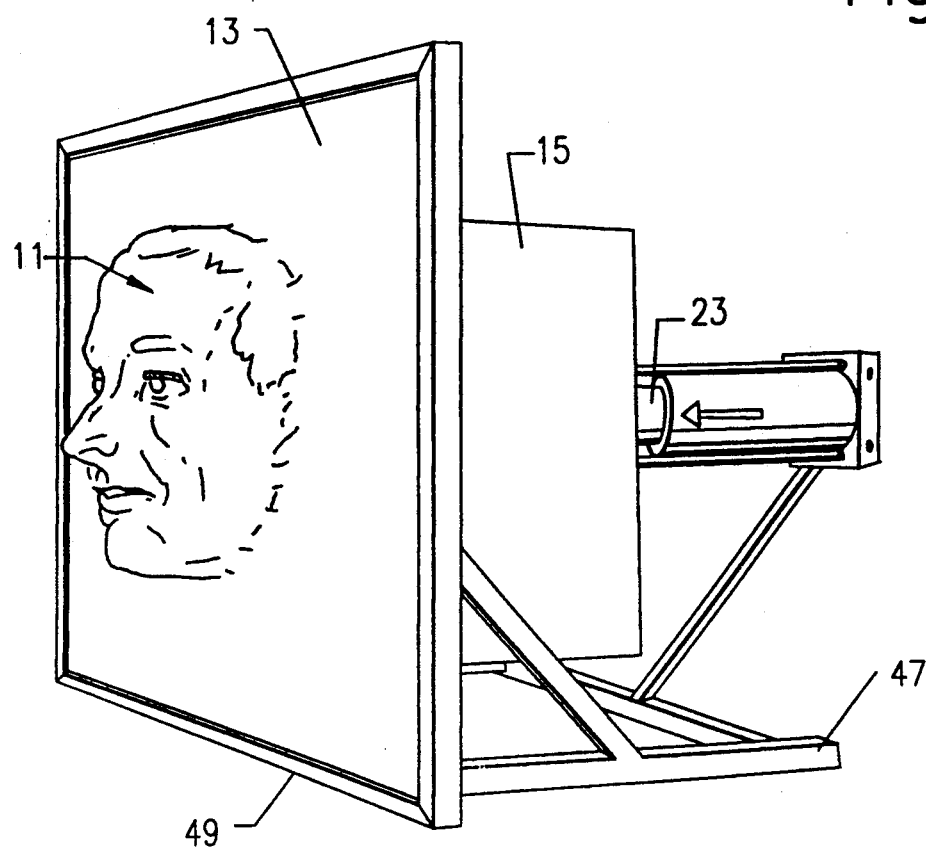
FIG. 2 is another perspective view of the device of FIG. 1, but showing vacuum assisted deformation of the elastic screen to the shape of the three-dimensional object, which has been moved into an extended position by the piston.
Figure 3:
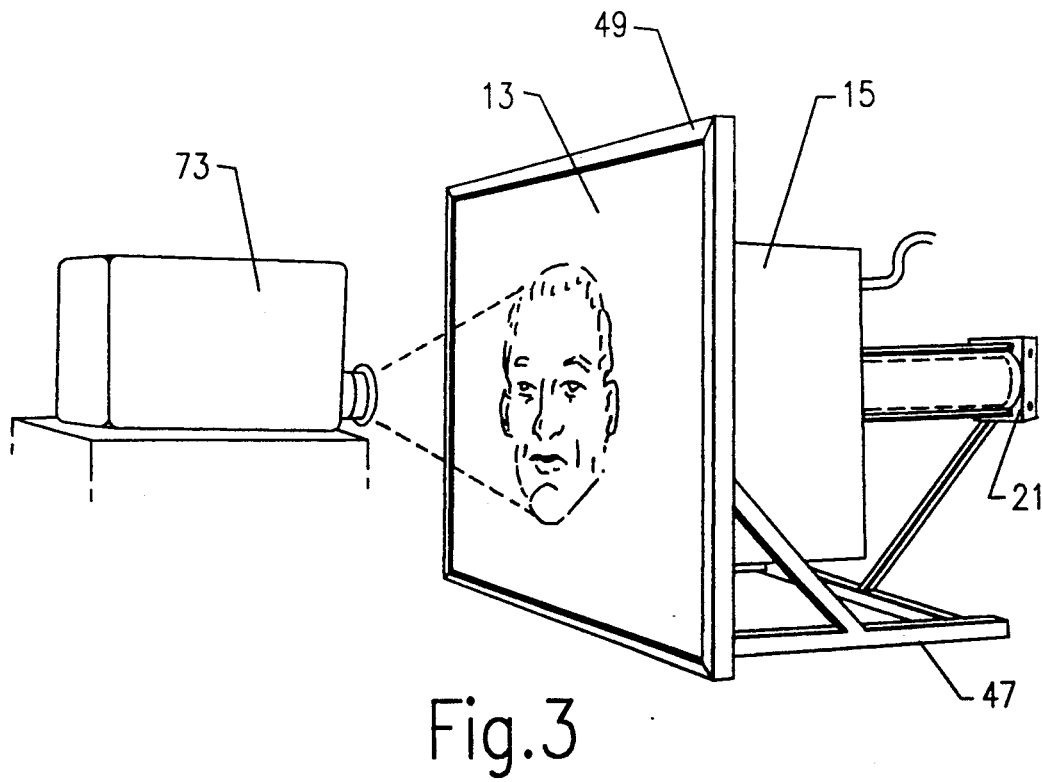
FIG. 3 is a view of the device in the withdrawn position, as shown in FIG. 1, but showing projection of a first image, corresponding to the hidden three-dimensional object, upon the undeformed screen.

In accordance with the present invention, a three-dimensional object 11 is engaged with a elastic screen 13 so as to deform that screen to the shape of the three-dimensional object. While the current preferred implementation is to utilize a moving means to move the three-dimensional object within a vacuum compartment 15 at the rear of a screen into engagement with the screen 13 so as to exactly conform the screen to the objects, features, as shown in FIG. 2, it is also contemplated that the screen could itself be moved against the object 11 or sucked through a mold (not shown) in an equivalent manner.

Figure 7:
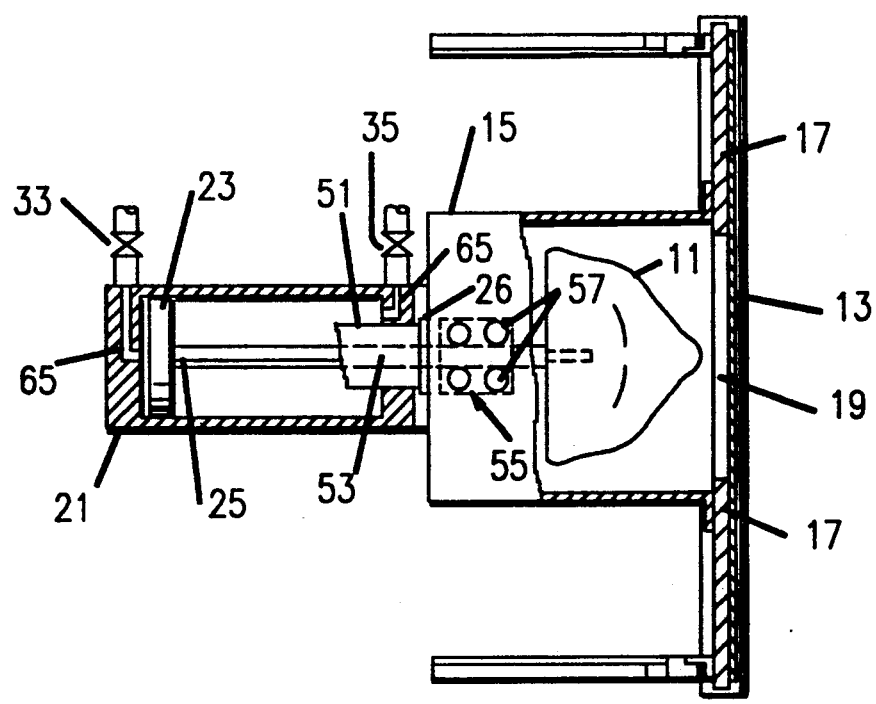
FIG. 7 is a modified plan view of the apparatus of FIG. 6, looking along the direction shown by the lines 7—7 of FIG. 5, and showing the three-dimensional object in a withdrawn position relative to the elastic screen.

As shown in the accompanying drawings, the invention is preferably embodied in a three-dimensional object 11, shown in FIGS. 5-7 as a statue of a head, that is moved to engage the screen 13 and thereby deform the screen to the features of the object. The object is entirely enclosed within a vacuum chamber 15, one side of which is the elastic screen 13 and an associated frame 17 that maintains the screen in a taut and planar condition. The frame also has an opening 19 through which the object engages the screen and the vacuum adheres the screen to the object's surface.

The moving means includes a piston chamber 21, having a piston 23 and a connector rod 25, which is mounted outside the vacuum chamber 15. The connector rod 25 moves the object either toward the screen 13 to thereby deform the screen to the object's features, or away from that extended position so as to allow the screen to elastically return to its two-dimensional form. As shown in the drawings, the piston chamber 21 is positioned at the rear of the vacuum chamber. The piston 23 couples to the three-dimensional object 11 through vacuum seal and thrust bearing 26 via a connector rod 25 to allow the object to move in unison with extension of the piston 23. These elements are part of the engine means, which also includes a compressed air supply 27 for supplying compressed air to the piston chamber 21, a two-position, four-way pneumatic valve 29 that regulates the supply of compressed air to the piston chamber and the coupling of a non-working end of the piston to an exhaust 31, and associated valves 33 and 35 and couplings for these elements. The moving means also includes a guide means comprising a linear bearing 37 that guides movement of the object 11.

Figure 8:
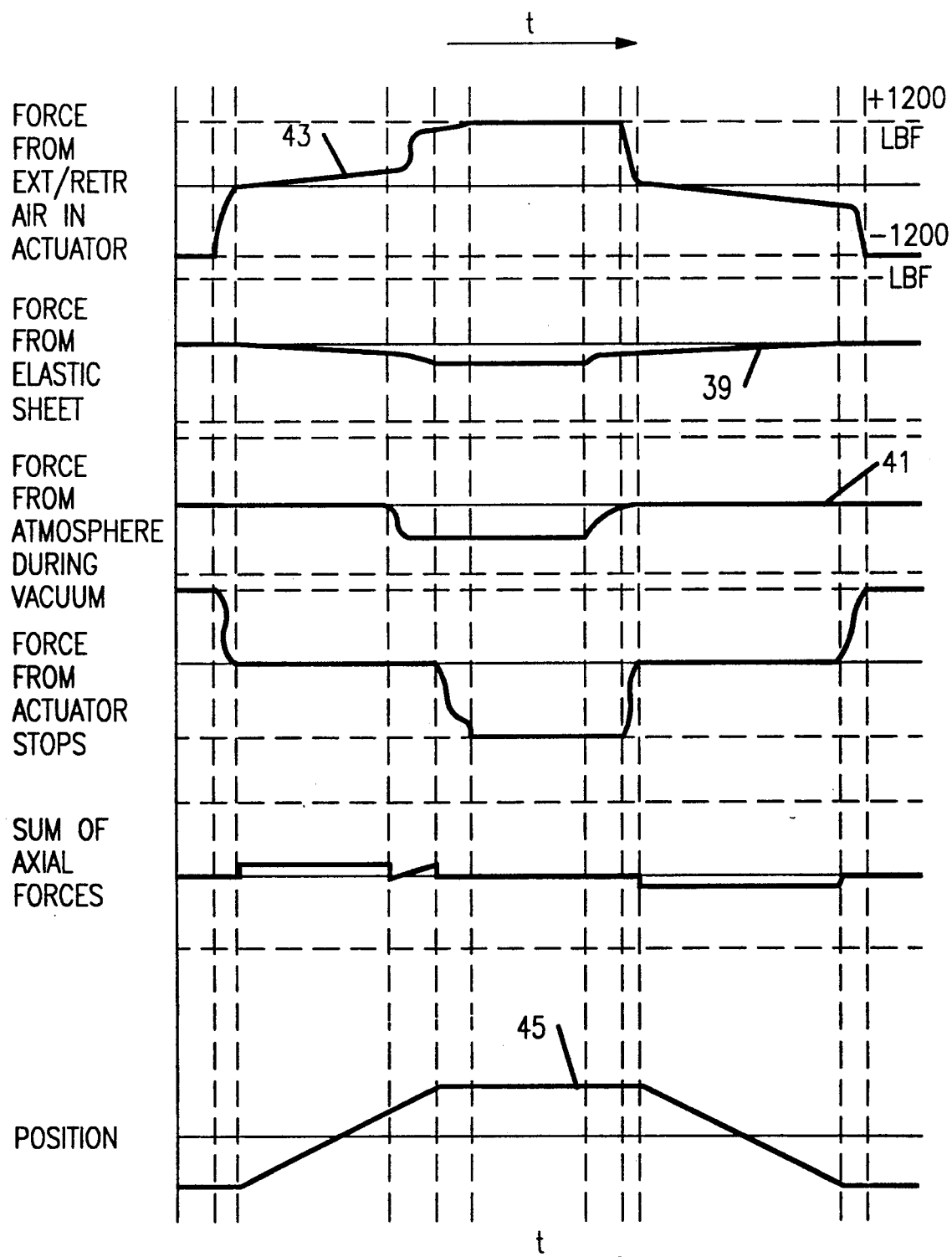
FIG. 8 is a chart that illustrates the various forces that operate upon the preferred embodiment when it is used in accordance with the principles of the invention.

The forces that combine to exactly adhere the screen to the surface of the three-dimensional object may be better understood by referring to FIG. 8, taken in conjunction with FIGS. 5-7. The connector rod 25 attached to the object is driven back and forth by the piston 23 which is attached to its other end. The piston moves within the enclosed piston chamber 21, with compressed air being supplied from a compressed air supply 27. Compressed air is coupled to the rear end of the chamber to extend the connector rod 25 and to the opposite end of the chamber to retract it. The two-position, four-way valve alternatively couples the compressed air and exhaust 31 to the working and non-working ends of the piston in response to an electronic signal from a control element, which will be further described below.

As the piston 23 is extended towards the object 11, and before the object 11 contacts the elastic screen 13, the vacuum chamber 15 is depressurized to create a force pressing inward on the screen due to the difference in atmospheric pressures. This force is illustrated in FIG. 8 with respect to the relative timing of the events, and is designated by the reference numeral 41. Importantly, depressurization is commenced before the object 11 contacts the elastic screen to minimize the possibility of creating air pockets between the object and the screen, although the desired vacuum will not be achieved until a later time.

As the piston moves the three-dimensional object 11 into engagement with the elastic screen 13, the elasticity of the screen provides a resistive force to stretching and deformation, designated in FIG. 8 by the reference numeral 39. In addition, the pressure differential between the outside atmosphere and the interior of the vacuum chamber produces an additional force 41 that opposes deformation. Thus, the piston's force (43), derived from the compressed air, that moves the three-dimensional object 11 into engagement with the elastic screen 13 is chosen to overcome the combined forces, mentioned above.

Figure 4:
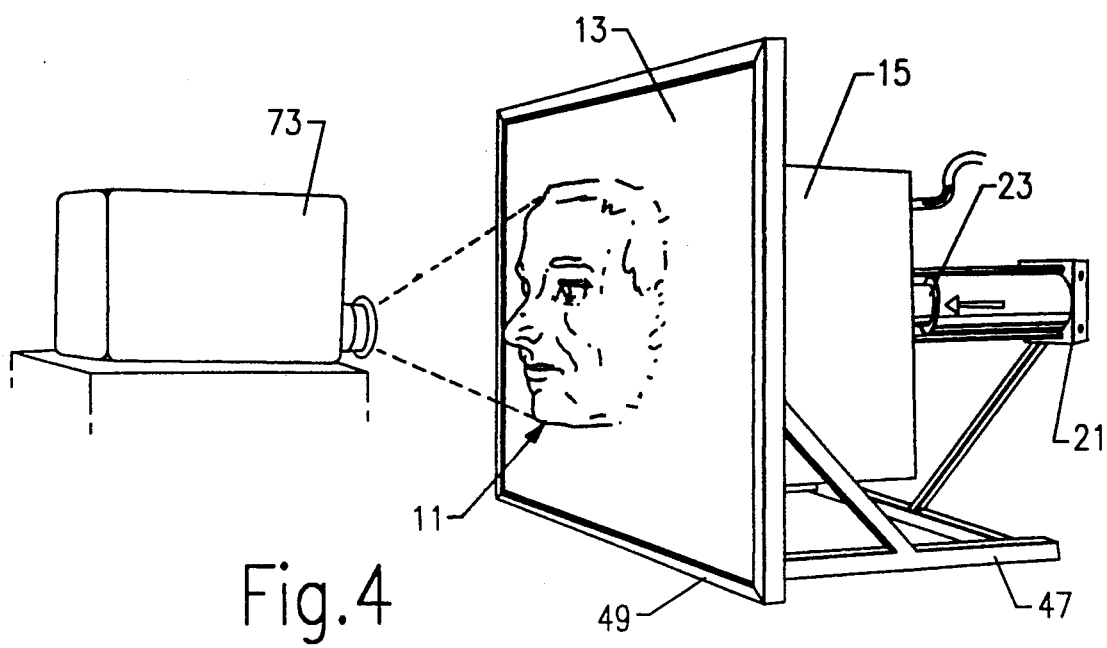
FIG. 4 is a view of the device in the extended position, as shown in FIG. 2, but showing projection of a second image upon the deformed screen, the second image related to the first image and adapted for projection upon the three-dimensional surface.

The piston 23 will move the three-dimensional object into engagement with the screen and to an ideal position for proper projection focus, designed in FIG. 4 as "FX" and by the reference numeral 45. The piston chamber 2 is selected such that the range of movement of the piston 23 corresponds to the range of movement of the object, and the focus position corresponds to the furthest possible extension of the piston 23. As an alternative, extend and retract stops could be implemented within the piston's range of movement, making the three-dimensional object's range of motion readily adjustable.

When the three-dimensional object 11 is to be removed from the extended position, the couplings of the compressed air supply 27 and exhaust 31 to opposite ends of the piston are switched by the two-position, four-way valve 29, such that air is directed to the forward end of the piston chamber 21 to drive the piston rearwards and to retract the object. The resultant force assists the forces of the outside atmosphere and the tension of the elastic material to return the three-dimensional object towards the original withdrawn position, which exists when the piston contacts the rear end of the piston chamber 21. During this retracting movement, the vacuum of the chamber 15 is released, eliminating any deformation of the screen caused solely by the differing pressure of the outside atmosphere.

With this understanding of the operation of the preferred embodiment in mind, the physical structure of the device shall now be discussed in greater detail.

With reference first to the dimensionally transformable surface, illustrated in FIGS. 5-7, it includes the three-dimensional object 11, the elastic screen 13, the frame 17 that frames the elastic screen, a supporting means, and an actuator and a suction device that assist in deforming the screen. The supporting means broadly includes a vertical mounting 47 that mounts the frame, and the vacuum chamber 15 which houses the three-dimensional object 11 used to deform the screen. The frame, which is cut from a ½" thick sheet of acrylic, provides not only a mounting for the elastic screen, but also firm support in areas in which the screen will not be deformed. In the areas of the screen subject to deformation, the three-dimensional object will pass through the opening 19 of the frame to engage the screen. The opening is configured to be larger than the object to allow sufficient additional space for the vacuum to draw the screen skintight against the three-dimensional object. The vacuum chamber 15 utilizes the opening 19 and the overlaid elastic screen 13 as a "sixth wall" and therefore is connected to the frame adjacent to but outside the borders of the opening, as shown in FIG. 4.

The design criteria for the elastic screen include the requirement that it be composed of an elastic material that must be able to stretch significantly, optimally 600%, without failing. In addition, the preferred elastic material could (1) be easily repaired by patching without visible intrusion, (2) serve as an adequate projection surface so that an animated image could be registered to the moving rigid body and enhance the transformation effect, (3) be such that seams would not appear on the screen, no matter the screen's size, and (4) have at least 50,000 cycles of elongation without failing. These criteria generally require that a suitable screen be composed of molded material. An appropriate material, composed primarily of silicone elastomer and having an opaque white finish, is sold by the Dow Corning Corporation of Midland, Michigan, under the designation "HSII RTV."

Contemplated alternative embodiments may employ an elastic screen which need not be white. For example, the elastic screen may be painted upon when engaged with and deformed by the object, and subsequently allowed to dry. The result, when the screen and object are moved towards the extended position, is a two-dimensional distorted image that appears to come to life and stretch to its proper, three-dimensional proportions.

The elastic screen is laid out across the frame 17 and is molded to be approximately six inches larger than the frame in height and width, such that the material overlaps the edges of the frame. The material is folded around and behind these edges of the frame 17 and a U-shaped clamp 49 is applied over each of the four edges to pinch the screen evenly, and thus allow for a stronger mechanical connection without the risk of tearing the screen. The clamp 49 receives screws (not shown) on a side of the U-shape opposite the projection side of the screen 13, which are tightened to pinch the elastic screen against the frame 17 and to press the projection side of the U-shape of the clamp against the elastic material.

The vacuum chamber 15, which is rectangular, is mounted to the rear side of the frame overlying the opening and enclosing the object 11. The rear vertical wall of the vacuum chamber connects to the piston chamber 21, with the connector rod 25 extending in sealed relation between the vacuum and piston chambers 15 and 21. The vacuum chamber must be of sufficient depth to accommodate the three-dimensional object in the withdrawn position, in which the object neither engages nor deforms the elastic screen, and is preferably small in volume so that a vacuum can be more quickly created and more easily maintained. Therefore, as mentioned, the piston is preferably mounted outside the vacuum chamber, though it could equivalently be mounted within the vacuum chamber.

A guide channel 51 also couples to the rear of the vacuum chamber 15 to support movement of the three-dimensional object 11 through the opening 19 in the frame and into and out of engagement with the elastic screen. The linear bearing 37 may extend back and forth within this guide channel, and it comprises an elongated bar 53 having semicircular grooves (not shown) along the bar's length and a block 55 having semi-spherical indentations (not shown) that retains ball bearings 57 to slidably mount the bar 53. This guide means cooperates with the engine means in mounting the three-dimensional object 11 and in ensuring that the object travels along a predefined linear path.

The engine means will now be described in greater detail. The piston chamber 21 is coupled to the compressed air supply 27 so that the connector rod 25 can be selectively extended and retracted. The air supply 27 includes a compressed air storage tank 59 and an air compressor 61 connected to the storage tank for maintaining a 110 p.s.i. air pressure in the storage tank. The two-position four-way pneumatic valve 29 interfaces between the piston chamber 21 and the air supply 27 and is electronically actuated by control elements 63, described below. Thus, when it is desired to move the three-dimensional object II towards the position of deformation, the compressed air supply 27 and exhaust 31 are coupled by two lines to ingress/egress tubes 65 at alternate ends of the piston chamber. The piston will thereby be extended towards the elastic screen as will the connector rod 25 and the three-dimensional object, which are coupled to the piston.

As the three-dimensional object is moved towards the elastic screen 13, a vacuum pump 67 is activated to create a vacuum in the vacuum chamber 15, as will be further explained below. Since the force of the piston's expansion is chosen to overcome the forces of the elastic screen 39 and pressure from the outside atmosphere 41, the object will engage and deform the screen which will be conformed in skintight relationship to the three-dimensional object by the forces 39 and 41. The speed of engagement and deformation may be tailored to the desired effect by adjusting the excess force of the piston's expansion. As indicated, the vacuum pump 67 is preferably activated before the three-dimensional object 11 contacts the screen, so as to eliminate any air pockets that might otherwise be trapped between the elastic screen 13 and the three-dimensional object 11.

Figure 9:
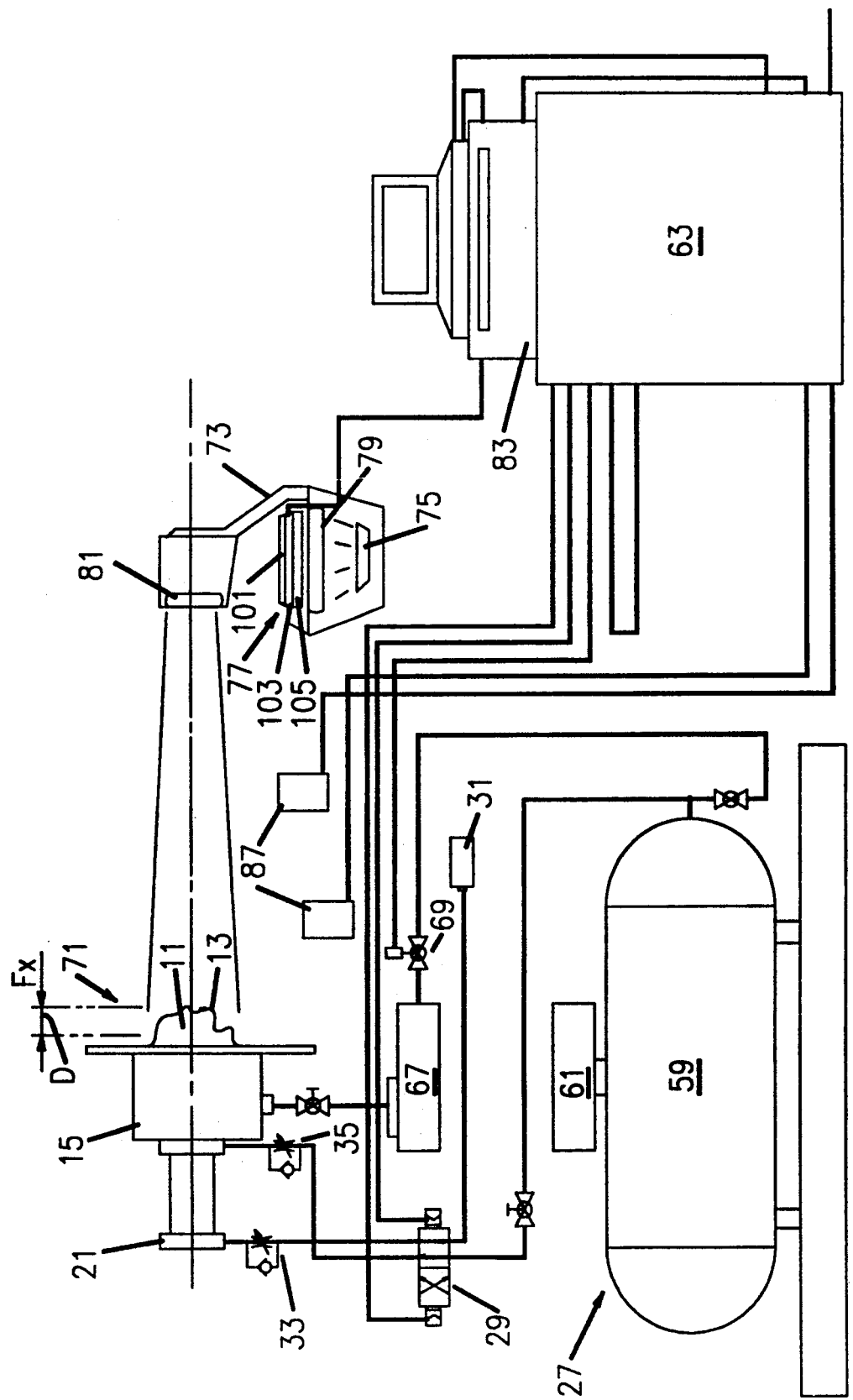
FIG. 9 is an illustrative view of a projection system that embodies the principles of the current invention.

As indicated in FIG. 9, the pressure of the air supply 27 is chosen to supply approximately 1100 foot-pounds pounds to move the object into deforming engagement with the screen. In the preferred embodiment, the selected air supply pressure is 110 p.s.i. However, as mentioned, the choice of these values is dependent primarily upon the desired special effect. For example, one contemplated application of the invention is an amusement device where a cartoon character is seemingly made to forcefully impact a wall. Under such circumstances, a larger pressure for the air supply 27 need be chosen to instantaneously draw a vacuum in the vacuum chamber 15 and to suck the elastic screen 13 through a three-dimensional mold (not shown). A larger pressure would also be necessary in embodiments where it is desired to rapidly move the three-dimensional object into contact with the elastic screen. It will thus be seen that the pressure of the compressed air supply may be tailored to suit a wide range of desired special effects.

When the three-dimensional object is to be retracted, the four-way valve is switched to its second position wherein the ingress-egress tubes 65 are switched in their coupling to the air supply 27 and the exhaust 31. The piston is thus forced in rearward movement and pulls the three-dimensional object II out of engagement with the screen 13, which is allowed to return to its taut, planar form. The vacuum pump 67 is also disconnected which removes the pressure of the outside atmosphere from providing a deforming influence upon the screen.

In the preferred embodiment, the differential pressure means includes the vacuum chamber 15, the vacuum pump 67, the compressed air supply 27, and an electronically actuated valve 69 that upon activation couples compressed air to the pump to draw a vacuum in the vacuum chamber. The vacuum chamber 15 is sealed to the frame 17 with a silicone grease.

The pump 67 is a multi-stage venturi pneumatic vacuum pump which draws air from the vacuum chamber. When supplied with compressed air by the electronically actuated valve 69, the pump draws air from the vacuum chamber 15 to create a vacuum. The venturi is an open path unit which allows air to flow in either direction, and hence, when the unit is not energized, air can pass from the opposite direction and thereby repressurize the vacuum chamber. Therefore, the vacuum is digital, and deactivation of the vacuum pump 67 results in repressurization of the vacuum chamber 15 and its stabilization to the pressure of the outside atmosphere. Importantly, as the venturi pump is an on-demand device, it overcomes the problem of change of the vacuum chamber's volume caused by deformation of the screen by the three-dimensional object and resulting expansion of the size of the vacuum chamber.

While the aforementioned venturi pump is used in the case of the preferred embodiment, certain effects will require other types of pumps. For example, where the three-dimensional object and the elastic screen are to be rapidly engaged, it may be appropriate to use a device that maintains some vacuum in the vacuum chamber 15 when the elastic screen and the object are in the withdrawn position, rather than permitting repressurization. Alternatively, it may be appropriate to utilize a more powerful pump that can create the desired vacuum almost instantaneously. The selection of a vacuum pump appropriate to a specific desired effect is well within the skill of one familiar with fluid mechanics.

With reference to FIG. 9, the projection and control elements of the preferred embodiment will now be more fully described. The dimensional transformation apparatus, broadly indicated by the reference numeral 71, is aligned for projection of lighting to enhance the effect of the deformed screen. For example, projection may include shadowing, coloring, a still image or sequence of image, an animated character, or an image that corresponds to the features of the object. A projector 73, which may include any device suitable for projecting light, such as a three-gun CRT projector or video projector, is chosen to be an overhead type projector in the case of the preferred embodiment. This projector includes a light source 75 for projecting light upon the object and an addressable light filter means 77 mounted between an objective lens 79 and a condensing lens 81 of the projector. These two lenses are conventional in most overhead-type projectors to enable focusing and alignment of the light for projection purposes. In the present invention, the objective lens 79 and the condensing lens 81 are specially configured to provide a relatively large depth of field such that projection can be maintained and focused upon the three-dimensional object over the entire depth of field, shown by the referenced designation D of FIG. 10. The addressable light filter means 77 is taken to include any projection device that electronically enables projection of an image by subtraction of light from the white light of the projector's light source 75.

Control over the light filter means is performed by a computer 83 having a suitable memory device (not shown) for storing data representing the images to be displayed upon the screen 13. In the case of the preferred embodiment, this memory device is chosen to be the computer's memory itself in the form of a resident hard disk. Alternatively, as illustrated in phantom lines in FIG. 10, a video laser disc player 85 may be coupled to both a video projector (not shown) and to the computer 83.

The light filter means comprises a plurality of optically super positioned liquid crystal panels 101, 103 and 105. Each of these panels is composited with a color filter and is comprised of a plurality of addressable pixels (not shown) which are individually controlled in response to the computer's output to generate color elements for the composite image. The liquid crystal panels in the preferred embodiment are designed to accept RGB signals from the computer and have circuitry for segregating the individual red, green and blue signals and appropriately configuring the pixels of each of the individual liquid crystal panels.

As mentioned, each of the liquid crystal panels is optically composited with a color filter, and in particular, are individually composited with yellow, cyan, and magenta filters. These secondary colors are chosen to subtract light from the projected light so as to project red, green and blue light to create a projected color image upon the object.

In order to sequence and synchronize the mechanical events of the three-dimensional object with the projection and sound effects used to enhance the effect of the projected image, a multi-media control system is required. In an alternative embodiment, this control system could work off of a SMPTE time code tract on the projection medium, as in the case of the video laser disk player 85, mentioned above. In such a system, all other events would be slave to the projection and would accordingly be sequenced and synchronized with respect thereto.

For purposes of our preferred embodiment however, the image source is the computer's resident memory, and the audio source is a random access memory (not shown) of a digital audio system 87. The audio system of this embodiment is also slave to the projection and is synched thereto by a MIDI sequencer 89. A digital sampler 91 interprets the MIDI signals to the audio system 87 and plays a digitally stored sound track in cooperation with the audio system 87. In the case of the video laser disc, voice and audio do not need to be independently played and synchronized to the projection, as this is inherently accomplished by the video disc. The cycle in that configuration would be commenced by the computer 83 and subsequently sequenced by the sequencer 89.

In the case of the preferred embodiment, a "MACINTOSH" portable computer, made by Apple Computer, Inc. of Cupertino, California, is used in conjunction with a multi-media graphics software package called "DIRECTOR," which is available from Macromind, Inc. of San Francisco, California. This software package features scripting, such that an appropriate program may be written to output stored frames to the projector corresponding to the projection image, and to communicate in MIDI protocol to the sequencer to initiate a projection cycle.

In the preferred implementation of the invention, a cycle is utilized whereby the MIDI sequencer 89 directs the object's movement back and forth into the extended position wherein it engages the screen 13, which is then projected upon. In this manner, cycles of the effect may be individually shown to different groups of theme park guests. After projection is finished, the object is withdrawn and the cycle re-initiated for a subsequent group. The drafting of an appropriate program using the scripting features of the "DIRECTOR" program to implement the described cycle is well within the skill of anyone familiar with computer programming.

The "MACINTOSH" computer features a high resolution graphics output for which the liquid crystal filter will generally have insufficient resolution to reproduce. To this end, an RGB transcoder 93 is implemented to interface between the monitor output of the computer 83 and the light filter means 77 in order to provide the light filter means 77 with an RGB signal.

Figure 10:
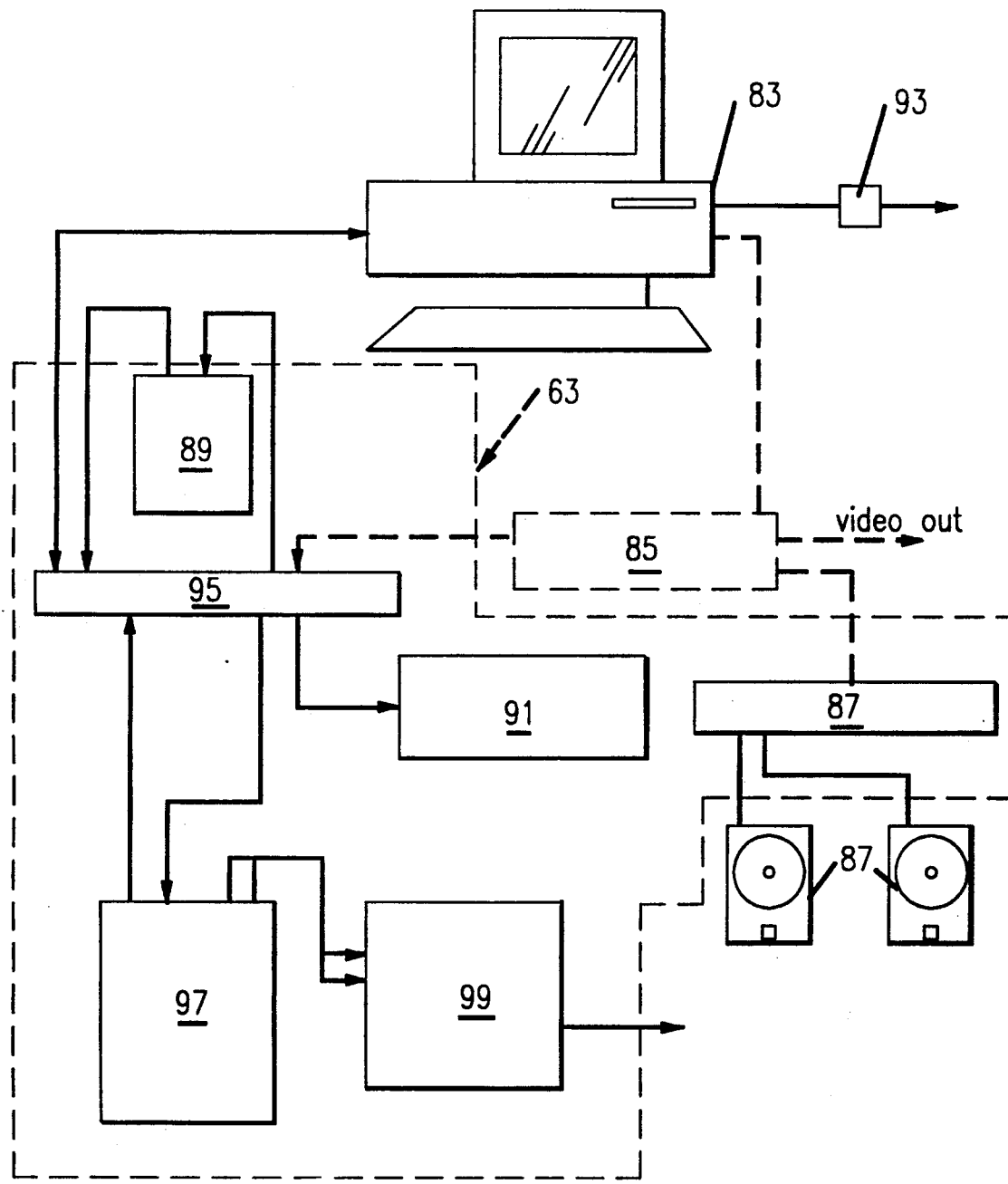
FIG. 10 is block diagram that illustrates the control elements of the projection control system shown in FIG. 9.

As shown in FIG. 10, the control means utilized to control creation of the vacuum and the projection upon and actuation of the object includes the sequencer 89 and a timer 95. In the preferred embodiment, communication is serial and uses MIDI protocol. For this reason, the MIDI timer is utilized to count digital pulses and to route digital messages to the various elements of the system. In a system where actuation of the elements is slave to projection, as is the case with the preferred embodiment, the timer 95 must be initialized and a reference time defined to correspond to the projection cycle. The sequencer 89 maintains a count corresponding to clock pulses elapsed since the reference time and sends electronic signals to each of two-position, four-way valve 29 to control the piston 25 and the electronically actuated valve 69 to control the vacuum pump 67. In addition, the sequencer provides signals to the digital sampler 91, which instigates play of a soundtrack by the sound system 87, and to a MIDI lighting panel 97 that controls an output panel 99. This output panel directs background lighting and other desired effects which are removed from the projection.

In the case of the alternative embodiment that utilizes the video laser disk player, discussed above, the video disk player 85 controls the timing and sends the video track's SMPTE time code to the MIDI timer 95, which converts that data to MIDI format.

For a method of digitally creating the image to be projected upon the three-dimensional object utilizing the projection and control elements of the current invention, please see the co-pending application for Apparatus and Method for Projection Upon a Three-Dimensional Object, Ser. No. 776,075, filed Oct. 11, 1991.

In the preferred embodiment, the modem port (not shown) of the "MACINTOSH" computer 83 is utilized to send a MIDI start signal to the timer 95 through a MIDI/ "MACINTOSH" converter (not shown). Simultaneously, the computer directs projection via the RGB transcoder 93. This allows the projection and actuation of the various elements to run in cycles independently of each other, but to start in sync. At various times, the MIDI lighting panel 97 independently directs the output panel 99 to augment the effect of the projected image by providing background lighting and other special effects that are sequenced to the projection cycle and to the actuation of the three-dimensional object. Also, the audio system 87 is synchronized with projection to generate the soundtrack and additionally to enhance and to disguise the mechanical noise of the actuator during transition.

The MIDI sequencer 89 also controls actuation of the three-dimensional object through electronic signals to the two-position, four-way valve to alternatively fill the opposing ends of the piston chamber. In addition, the sequencer transmits electronic signals to control the valve 69 and to govern supply of compressed air to the venturi pump 67, thereby sequencing creation and release of the vacuum.

Thus, as an example, a cycle may include projection of first image to give the impression that the two-dimensional elastic screen is the front panel of a TV set. A second projected image may be of a face, such as of a cartoon character, that when projected upon a dimensionally transformed projection surface, gives the illusion that the character's head, vividly depicted, has physically emerged from the screen and is proceeding to talk or otherwise move. Alternatively, these images may comprise lighting and shadowing effects that only very generally correspond to the features of the character's head.

An alternative embodiment of the invention utilizes clear transparent elements behind the screen to allow for rear projection, as opposed to front projection. As one example, the projector could be mounted within the vacuum chamber and made to project upon the reverse side of the screen, which is drawn through a three-dimensional mold. Alternatively, a three-dimensional object could be transparent so as to allow for projection through the three-dimensional object and onto the rear of the screen.

A further contemplated embodiment would feature movement of the three-dimensional object, or parts thereof, once in contact with the screen, thus providing additional animation to the resultant effect. For example, air pockets, created by air bladders or actuators, may be selectively created between the object and the elastic screen to impart apparent animation to the object itself. Alternatively, air could be pumped between the object and the screen to provide for other interesting effects created by the vacuum's draw on the newly added air. As can be readily seen, a great many interesting effects may be created by using a number of imaginative options without departing from the principles of the invention.

Having thus described several exemplary embodiments of the invention, it will be apparent that various alterations, modifications and improvements will readily occur to those skilled in the art. Such alterations, modifications, and improvements, though not expressly described above, are nonetheless intended and implied to be within the spirit and scope of the invention. Accordingly, the foregoing discussion is intended to illustrative only; the invention is limited and defined only by the following claims and equivalents thereto.

I claim:

1. A dimensional transformation apparatus comprising:
   an elastic screen;
   a frame having an opening, said frame supporting said screen in a taut, planar condition extending across said opening,
   a three-dimensional object;
   supporting means for supporting said frame and said object for relative movement between
      an extended position in which said object extends at least partially through said opening to deform said screen whereby elastic forces caused by the deformation of said screen draw it in skintight conforming relation over underlying portions of said object with which it is in contact, and
      a withdrawn position in which said object does not extend through said opening;
   moving means connected with said supporting means for causing relative motion of said object and said frame between said extended and withdrawn positions; and differential pressure means connected with said supporting means for applying pressure against the side of said screen opposite said object, thereby assisting elastic forces in drawing said screen against said object.

2. The apparatus of claim 1, further comprising projection means connected with said supporting means for projecting light upon said screen in the region thereof deformed by said object when in said extended position.

3. A dimensional transformation apparatus comprising:
   an elastic screen composed of a silicone based elastomer;
   a frame having an opening, said frame supporting said screen in a taut, planar condition extending across said opening,
   a three-dimensional object;
   supporting means for supporting said frame and said object for relative movement between
      an extended position in which said object extends at least partially through said opening to deform said screen whereby elastic forces caused by the deformation of said screen draw it in skintight conforming relation over underlying portions of said object with which it is in contact, and
      a withdrawn position in which said object does not extend through said opening; and
   moving means connected with said supporting means for causing relative motion of said object and said frame between said extended and withdrawn positions.

4. The apparatus of claim 3, further comprising differential pressure means connected with said supporting means for applying pressure against the side of said screen opposite said object, thereby assisting elastic forces in drawing said screen against said object.

5. The apparatus of claim 3, further comprising projection means connected with said supporting means for projecting light upon said screen in the region thereof deformed by said object when in said extended position.

6. A dimensional transformation apparatus comprising:
an elastic screen;
a frame having an opening, said frame supporting said screen in a taut, planar condition extending across said opening,
a three-dimensional object;
supporting means for supporting said frame and said object for relative movement between
an extended position in which said object extends at least partially through said opening to deform said screen whereby elastic forces caused by the deformation of said screen draw it in skintight conforming relation over underlying portions of said object with which it is in contact, and
a withdrawn position in which said object does not extend through said opening;
moving means connected with said supporting means for causing relative motion of said object and said frame between said extended and withdrawn positions; and,
projection means connected with said supporting means for projecting light upon said screen in the region thereof deformed by said object when in said extended position.

7. The apparatus of claim 6, further comprising differential pressure means connected with said supporting means for applying pressure against the side of said screen opposite said object, thereby assisting elastic forces in drawing said screen against said object.

8. The apparatus of claims 1, 3 or 6, wherein said moving means comprises:
guide means for guiding the relative movement of said object and said screen between said extended and withdrawn positions, which includes a region in which the direction of relative motion between said object and said screen is generally perpendicular between initial contact of said object and said screen and said extended position; and,
engine means connected to said object and said frame for selectively causing their relative motion along said path.

9. The apparatus of claim 8, wherein said engine means comprises:
a piston;
a cylinder that houses said piston, said cylinder having a first end and a second end, said cylinder connected to said supporting means;
fluid supply means for supplying a compressed fluid to said first end and for removing said compressed fluid from said second end to extend said piston, and for supplying said fluid to said second end and for removing said fluid from said first end to retract said piston; and,
a connector rod that connects said piston to said object to move said object to said extended position when said piston is extended and to move said object to withdrawn position when said piston is retracted.

10. The apparatus of claims 1, 3 or 6, wherein said object and said screen undergo relative motion along a path which is linear and substantially perpendicular to the plane of said screen.

11. The apparatus of claims 1, 3 or 7, wherein said differential pressure means comprises:
a vacuum chamber connected to said screen support structure, said vacuum chamber enclosing said object for relative motion within said chamber toward and away from said screen; and
suction means communicating with said vacuum chamber for selectively creating and releasing a vacuum in said vacuum chamber.

12. The apparatus of claims or 7, further including control means for controlling and sequencing operation of said differential pressure means and said moving means to cause pressure to be applied against the side of said screen opposite said object at least when said object is in said extended position.

13. The apparatus of claim 12, wherein said control means includes:
a timer; and,
a sequencer coupled to said timer so as to receive timing signals from said timer and to maintain a count with respect to a reference count, said sequencer coupled to said moving means and to said differential pressure means, said sequencer effective to provide trigger signals
(a) to said moving means to cause relative movement between said engaged and disengaged positions in response to a first predetermined value of said count, and
(b) to said differential pressure means to apply pressure against said screen in response to a second predetermined value of said count.

14. The apparatus of claim 12, wherein said control means also controls and sequences said projection means, projection of light upon said screen to occur when said object is in said extended position.

15. The apparatus of claim 14, wherein said control means includes:
a timer; and,
a sequencer coupled to said timer so as to receive timing signals from said timer and to maintain a count with respect to a reference count, said sequencer coupled to said projection means, to said moving means and to said differential pressure means, said sequencer effective to provide trigger signals
(a) to said projector to trigger projection of light in response to a first predetermined value of said count,
(b) to said moving means to cause relative movement between said engaged and disengaged positions in response to a second predetermined value of said count, and
(c) to said differential pressure means to apply pressure against said screen in response to a third predetermined value of said count.

16. The apparatus of claim 15, said control means further including:
a computer coupled to said projection means and to said sequencer, a memory that is connected to said computer and is adapted to store data representative of an image to be projected;
graphics software effective to process the data stored in memory and to transmit the data to said projection means for projection of the image represented by the data; and,
wherein said computer is effective to initiate a cycle of counting of said sequencer.

17. The apparatus of claims 2 or 6, wherein said projection means projects a light pattern upon said screen when in said extended position and a light pattern upon said screen when in said withdrawn position.

18. The apparatus of claims 2 or 6, wherein:

said projection means includes addressable light filter means for selectively filtering the light of said projection means so an image is projected upon said object, said addressable light filter means including at least one addressable liquid crystal panel; and, data representative of the image is stored in a memory of said projection means that is coupled
to said addressable light filter means, said addressable light filter means adapted to project the image in response to said data.

19. The apparatus of claims 2 or 6, wherein said projection means includes a memory for storing a sequence of related images for projection upon said screen to provide animation.

20. The apparatus of claims 2 or 6, further including control means for controlling and sequencing operation of said projection means' projection of light upon said screen.

21. The apparatus of claim 20, wherein said control means includes:
a timer; and,
a sequencer coupled to said timer so as to receive timing signals from said timer and to maintain a count with respect to a reference count, said sequencer coupled to said projection means and to said moving means, said sequencer effective to provide trigger signals
(a) to said projector to trigger projection of the light in response to a first predetermined value of said count, and
(b) to said moving means to cause relative movement between said engaged and disengaged positions in response to a second predetermined value of said count.

22. The apparatus of claim 21, said control means further including:
a computer coupled to said projection means and to said sequencer, a memory that is connected to said computer and is adapted to store data representative of an image to be projected;
graphics software effective to process the data stored in memory and to transmit the data to said projection means for projection of the image represented by the data; and,
wherein said computer is effective to initiate a cycle of counting of said sequencer.

23. The apparatus of claims 1 or 6, wherein said elastic screen is a silicone based elastomer.

24. A method of transforming the shape of an elastic screen, comprising:
(a) framing an elastic screen in a taut and planar condition over an opening of the frame;
(b) supporting the screen for movement relative to a three-dimensional object between
an extended position in which the object extends at least partially through the opening deforming the screen whereby elastic forces caused by the deformation of the screen draw it in skintight conforming relation over underlying portions of the object with which it is in contact, and
a withdrawn position in which the object does not extend through the opening;
(c) moving one of the object and the screen relative to the other into the extended position;
(d) applying pressure to the side of the screen opposite the object in regions of the screen deformed by the object when in the extended position, whereby the pressure assists in pressing the screen in skintight conforming relation over underlying portions of the object; and,
(e) moving one of the object and the screen relative to the other into the withdrawn position.

25. The method of claim 24, further including the step of (f) projecting light upon the screen when in the extended position.

26. A method for imparting visual effects to a dimensionally transformable screen, comprising the steps of:
(a) framing an elastic screen in a taut and planar condition over an opening of the frame;
(b) supporting the screen for movement relative to a three-dimensional object between
an extended position in which the object extends at least partially through the opening deforming the screen whereby elastic forces caused by the deformation of the screen draw it in skintight conforming relation over underlying portions of the object with which it is in contact, and
a withdrawn position in which the object does not extend through the opening;
(c) moving one of the object and the screen relative to the other into the extended position;
(d) projecting light upon the screen in regions thereof deformed by the object when in the extended position; and,
(e) moving one of the object and the screen relative to the other into the withdrawn position.

27. The method of claim 26, further comprising the step of (f) applying a pressure to the side of the screen opposite the object in regions of the screen deformed by the object when in the extended position, whereby the pressure assists in pressing the screen in skintight conforming relation over underlying portions of the object.

28. The method of claims 24 or 27, wherein the step of applying pressure includes the step of applying a vacuum to the side of the screen facing the object during at least the time that it is in the extended position, thereby assisting the elastic forces in drawing the screen against the object.

29. The method of claims 25 or 26, further including the step of projecting a first pattern of light upon the screen when in the extended position and a second pattern of light upon the screen when in the withdrawn position.

30. The method of claims 24 or 26, further comprising the step of sequencing the performance of the steps (a)–(e).

31. The method of claim 30, wherein the step of sequencing steps (c)–(e) is accomplished by:
initiating a timer;
defining a reference time;
controlling each of steps (c)–(e) in response to predefined time differences corresponding to each of steps (c)–(e) between a current time as measured by the timer and the reference time.

32. The method of claims 25 or 26, wherein the step of projecting light includes the steps of:
storing data representative of an image in an electronic memory;
coupling electronic signals that include the data from the memory to a projector; and,
controlling a light filter of the projector with the electronic signals in a manner to project the image.

33. The method of claims 25 or 26, wherein the step of projecting light includes the steps of:
storing data representative of a sequence of images; and
projecting a sequence of related images upon the screen to provide animation.

* * * * *

UNITED STATES PATENT AND TRADEMARK OFFICE
CERTIFICATE OF CORRECTION

PATENT NO. : 5,159,362
DATED : October 27, 1992
INVENTOR(S) : Monroe et al.

It is certified that error appears in the above-identified patent and that said Letters Patent is hereby corrected as shown below:

Column 4, line 58: "!1" should be "11".

Column 7, line 5: "2!" should be "21".

Column 7, line 38: "II" should be "11".

Column 7, line 63: "pounds" should be deleted.

Column 14, line 6: "claims or 7" should be "claims 1 or 7".

Signed and Sealed this

Fifth Day of October, 1993

Attest:

BRUCE LEHMAN

Attesting Officer    Commissioner of Patents and Trademarks